3,074,198
NON-SLIP FISHING REEL ATTACHMENT
Paine L. Bush, 822 Stewart Drive, Dallas, Tex.
Continuation of application Ser. No. 761,004, Sept. 16, 1958. This application June 5, 1961, Ser. No. 120,116
12 Claims. (Cl. 43—22)

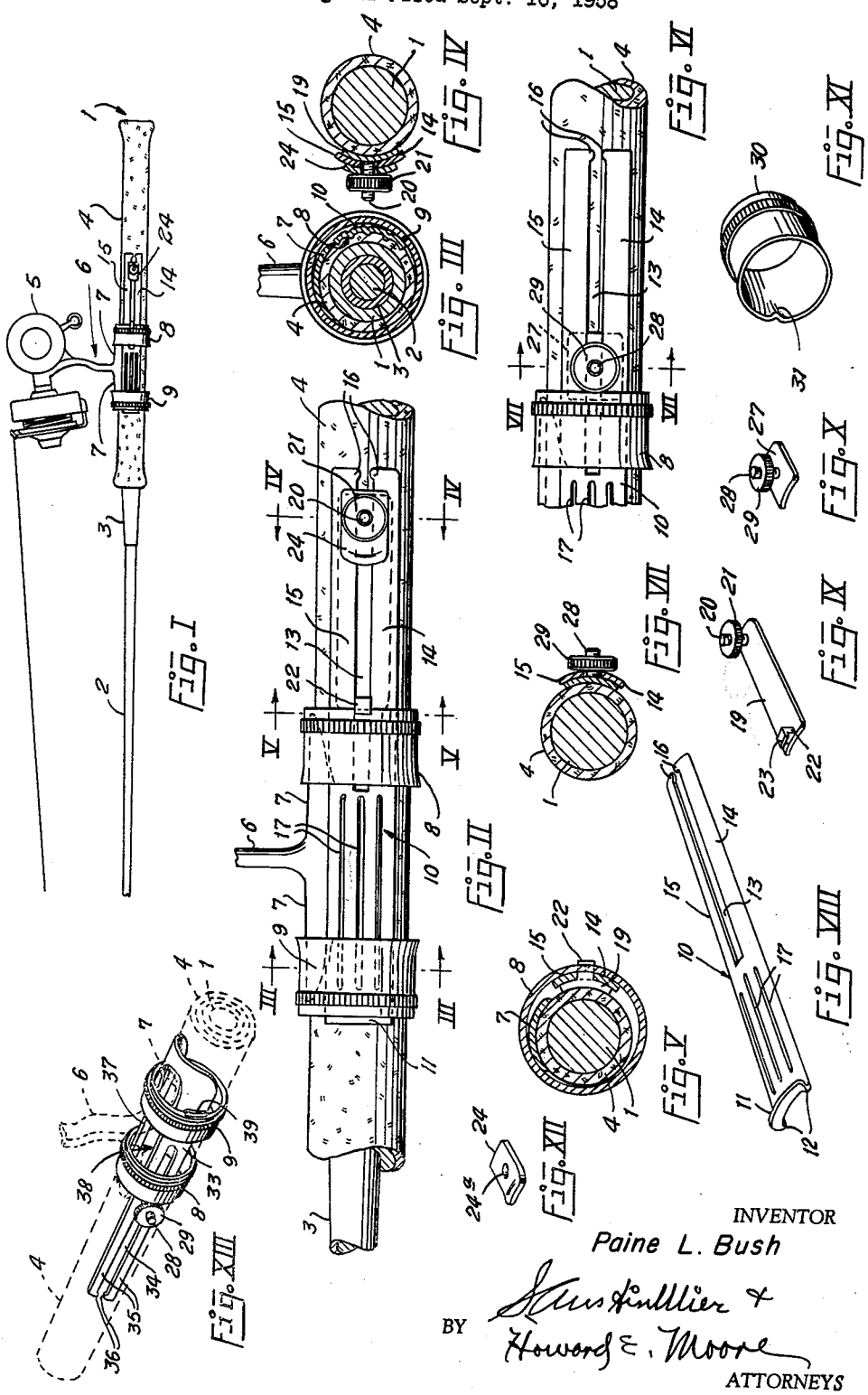

This invention is concerned with means for detachably securing a fishing reel to the handle of a fishing rod in such a manner as to prevent the reel from becoming loose and slipping sidewise or longitudinally of the handle.

This application is a continuation of my pending application for patent, Serial No. 761,004, filed September 16, 1958, now abandoned.

Fishing reels, particularly spinning reels, have customarily been attached to the rod handle by slip rings slidably disposed on the handle which are forced over the opposed, horizontally disposed extensions of the reel foot, said rings being slightly flexible so that they may be distorted and pressed into engagement with the reel foot and rod handle when forced over the extensions on the foot.

Considerable difficulty has been encountered in the use of such attachment means in that the rings become distorted to such an extent as to allow them to slip off the sloping reel foot or become loose thereon so as to permit the reel to move sidewise or longitudinally of the handle, thus requiring repeated adjustment, which interferes with the accuracy of casting, is wearing on the patience of the fisherman, and sometimes results in the escape of a fish in the process of the attempted landing of a strike.

This invention is intended to overcome the above recited difficulties.

It is, therefore, a primary object of the invention to provide a positive means for securing the clamping rings against slippage longitudinally or sidewise on the fishing rod handle.

Another object of the invention is to provide such positive securing means which are easily adjustable to conform to different types, sizes and dimensions of rod handles and reels.

A still further object of the invention is to provide such securing means which be employed with standard fishing rods and ring assemblies now on the market, and presently in use, such securing means consisting of a separate, adjustable adapter assembly which may be easily installed and adjusted on presently existing fishing reels without alteration in any manner of the construction of such fishing reels or rods with which they are used.

Suitable embodiments of the invention are shown in the attached drawing in which:

FIGURE I shows a spinning reel attached to the handle of a conventional spinning rod, employing the non-slip attachment means comprehended by this invention;

FIGURE II is an enlarged elevational view showing the attachment means secured to a rod handle and holding the clamp rings in place in engaged position with reference to the reel foot;

FIGURE III is a transverse, sectional view taken on the line III—III of FIGURE II;

FIGURE IV is a transverse sectional view taken on the line IV—IV of FIGURE II;

FIGURE V is a transverse sectional view taken on the line V—V of FIGURE II;

FIGURE VI is a fragmentary plan view showing the novel attachment means employing a modified adjustment lug;

FIGURE VII is a transverse sectional view taken on the line VII—VII of FIGURE VI;

FIGURE VIII is a top perspective view of the adapter plate;

FIGURE IX is a top perspective view of the adjustment lug and securing nut combination employed in the preferred form of the invention;

FIGURE X is a modified form of adjustment lug;

FIGURE XI is a modified form of a clamp ring to prevent sidewise movement of the reel foot;

FIGURE XII is a top perspective view of a lug employed with the preferred form of the invention; and FIGURE XIII is a top perspective view of a modified form of adapter plate in attached position with relation to a rod handle and reel, said form being intended for preventing sidewise movement of the reel with reference to the handle.

Numeral references are employed to designate the various parts shown in the drawing, and like numerals designate like parts throughout the various figures of the drawings.

The numeral 1 generally indicates a conventional spinning rod handle to which is attached a rod 2 by means of a conventional chuck 3.

The handle 1 is usually covered with cork material 4, or like resilient material.

A conventional spinning reel 5, having a reel foot 6 thereon, which foot includes right angular extensions 7, is attached to the rod handle by means of conventional clamping rings 8 and 9 which are forced over the extensions 7.

The reel foot is secured to the rod handle against longitudinal or sidewise slippage by means of the novel attachment means comprehended by this invention.

The non-slip securing means includes an adapter plate, generally indicated by the numeral 10, said adapter plate being formed to substantially the contour of the outer surface of the rod handle 1, except that it has in-turned edges 12 at the inner end thereof which may be pressed into the resilient material 4 of the handle to prevent sidewise slippage of the plate 10 with reference to the handle. The adapter plate 10 is of such a width that it covers not more than a circumferential area of 180° of the handle so that it may be applied and removed from one side of the handle.

One end of the plate 10 has an up-turned flange or extension 11 thereon which is arranged to abut against the clamping ring 9 to hold such ring against longitudinal outward movement with reference to the handle 1.

An elongated slot 13 is formed in the plate 10 of sufficient length to provide for adjustment of the clamping ring 8 with reference to the reel foot extensions 7 and to provide for adjustment for different types and dimensions of rod handles. The formation of the slot 13 provides a bifurcated portion having parallel legs 14 and 15 on the plate 10.

The plate 10 is preferably made of flexible, spring-like material so that, upon installing and adjusting the adapter plate, the legs 14 and 15 may be sprung outwardly to allow the adjustment stud 20 to be forced between the inward extending fingers 16 provided on the outer ends of the legs 14 and 15. After the stud 20 has been forced between the fingers 16 and into the slot 13 the legs spring inwardly to normal position, and the adjustment stud 20 is retained in the slot because the stud is greater in diameter than the passage between the fingers 16. Thus the assembly, including the adjustment lug, and the adapter plate, are retained in assembled position and the adjustment lug is not separated from the plate 10 when it is not in engaged position with the ring 8. Furthermore, the whole plate and adjustment lug aseembly may be sold as a unit for separate attachment to standard reels and rods.

A plurality of longitudinal, parallel inwardly extending channels 17, are pressed into the plate 17 which forms ridges 18 on the inner side thereof. When the adapter plate 10 is pressed into engagement with the resilient material 4 on the handle 1 the ridges 18 are pressed into such resilient material to prevent sidewise slippage of the plate 10 with reference to the rod handle.

The preferred form of adjustment lug is best shown in FIGURE IX. Such adjustment lug includes a base plate 19 which is preferably conformed to the shape of the outer contour of the handle 1. A threaded stud 20 is secured to the upper side of the plate 19 and has a thumb nut 21 threaded thereon.

An upwardly extending boss 22 is provided on the inner end of the base plate 19, said boss having an outwardly extending lip 23 thereon which extends over the edge of the ring 8 when the attachment means is in assembled position. The front side of said boss 22 engages the rim of said ring to hold the ring in adjusted clamping position. When the adjustment lug is assembled with reference to the plate 10 and ring 8 as shown in FIGURE II, there is preferably provided a washer 24 between the nut 21 and the upper face of the legs 14 and 15.

To attach the reel 5 to the handle 1, employing the novel, non-slip attachment means described above, the nut 21 is removed from the stud 20 and the base plate 19 is removed from the slot 13. The adapter plate 10 is then slipped under the rings 8 and 9 and the rings 8 and 9 are moved apart sufficiently to allow the extensions 7 on the reel foot 6 to be placed therebetween. The rings 8 and 9 are then forced over the extensions 7, and while such operation is being performed, the flange 11 is maintained in contact with the outer edge of the ring 9. Immediately prior to slipping the rings 8 and 9 into engagement with the extensions 7, the base plate 19 is slipped underneath the legs 14 and 15 and the stud 20 is forced between the fingers 16. The lug 24 is then placed over the stud 20 and the thumb nut 21 is threadedly engaged with the stud 20.

After the rings 8 and 9 have been forced over the extensions 7 of the reel foot 6, pressing the plate 10 firmly against the rod handle, the adjustment lug is adjusted so that the boss 22 engages the outer edge of the ring 8. The thumb nut 21 is then screwed down tightly against the legs 14 and 15. It will be seen that after such adjustment has been made, the ring 9 may not move outwardly because it is held by the flange 11, and the ring 8 may not move outwardly because it is held by the boss 22. The ridges 18 and the in-turned edges 12 are pressed into the resilient material of the handle which prevents sidewise movement of the plate and the rings 8 and 9, which are clamped thereto. Thus the reel foot is held firmly in place and the clamping rings may not move or slip with reference thereto, thereby holding the reel 5 firmly in place on the handle.

A modified ring 30 which may be either the ring 8 or 9 is shown in FIGURE XI which includes an inwardly extending rib 31 pressed inwardly on the inner end of the ring which rib is positioned so that it will rest against the edge of one of the foot extensions 7 to further insure that the reel foot may not move laterally with reference to the handle 1.

A modified adjustment lug is shown in FIGURES VI and X, which said lug includes a shortened base plate 27 having a threaded stud 28 secured thereto and extending upwardly therefrom, with a thumb nut 29 threadedly engaged therewith. Such modified adjustment lug is attached in the same manner as the preferred form of adjustment lug described above, except that it is moved inwardly to the extent that the thumb nut 29 directly engages the outer edge of the ring 8 to hold the ring in place. The preferred form shown in FIGURES II and IX are more satisfactory in that the outwardly extending stud 20 and thumb nut 21 are spaced sufficiently from the ring 8 so as not to come into contact with the hand of the fisherman as he holds the rod handle and manipulates the reel. However, the modified form of adjustment lug shown in FIGURE X would perform the same function as the preferred form of holding the ring 8 against longitudinal slippage.

A modified form of adapter plate 33 is shown in FIGURE XIII which includes an elongated slot 34 formed therein providing a bifurcated portion having spring-like parallel legs 35, and having inwardly extending retaining stops 36 formed on the outer end of the legs. Such slot, legs and retaining stops, in conjunction with the adjustment lug, performs the same function as described above with reference to the preferred form of the attachment means.

The modified adapter plate 33 includes a flange or offset leg 37 made integral with the adjustment plate and separated from the legs 35 by an opening 38 which is of sufficient width and length to receive the extensions 7 of the reel foot 6.

An upwardly extending boss 39 is formed on the body of the modified adapter plate 33 to engage with the ring 9 to hold it against longitudinal movement. In attaching the modified adapter plate to the rod handle, such plate is positioned with reference to the rings 8 and 9 in the same manner as was described above in connection with the preferred form of adapter plate, with the extension 7 on the reel foot 6 placed in the opening 38, as shown in FIGURE XIII. The flange, or offset leg 37, contacts the extensions 7 and prevents the reel from moving sidewise when the plate 33 is pressed into engagement with the rod handle by forcing the rings 8 and 9 over the extensions 7.

Either form of adjustment lug (shown in FIGURES IX and X) may be employed with the modified adapter plate 33. When secured in adjusted position, as shown in FIGURE XIII, the nut 29 holds the ring 8 against outward movement, boss 39 holds ring 9 against outward movement, and offset leg 37 holds the reel foot 6 against sidewise movement.

It will be seen that I have provided a reel attachment means which positively prevents the slippage of the clamping rings with reference to the reel foot, which is simple and easy to attach to standard fishing rods and reels, and which may be sold as a separate unit for attachment without alteration of the rod or reel.

It will be understood that other and further forms of the invention may be devised without departing from the spirit and scope of the appended claims.

I claim:

1. A fishing reel attachment device for a fishing rod handle having a pair of clamp rings disposed thereon, comprising; an adapter plate arranged to be slipped under said rings and covering a circumferential area of not more than 180° of the handle, said rings being movable longitudinally with reference to said plate; means on said plate engageable with one of said rings to limit movement of the ring longitudinally of the handle in one direction; and adjustable means carried by the plate and engageable with the other ring to limit movement of said other ring longitudinally of the handle in the other direction.

2. The combination called for in claim 1 wherein inwardly extending means is provided on the under side of the plate arranged to be pressed into engagement with the rod handle to prevent sidewise movement of the plate with reference to the handle.

3. The combination called for in claim 1 wherein inwardly extending means is provided on the inner side of one of the rings engageable with the foot of a fishing reel engaged by said rings to prevent sidewise movement of the reel.

4. The combination called for in claim 1 wherein the plate has a flange thereon engageable with the foot of a fishing reel to prevent sidewise movement of the fishing reel on the handle.

5. In a fishing reel attachment device for a fishing rod handle having a pair of clamp rings disposed thereon, comprising; an adapter plate arranged to be slipped under said rings; means on the plate engageable with one of said rings to prevent movement of the ring longitudinally of the handle in one direction; a bifurcated portion of said plate extending outwardly of the other ring along the handle, said bifurcated portion providing parallel legs; an adjustment member including a base plate slidable under the bifurcated portion, a threaded stud secured to the base plate and extending between the legs; and a nut threadedly engaged with the stud and arranged to be threaded into engagement with the said legs to hold the other said ring against longitudinal movement on the handle in the other direction.

6. The combination called for in claim 5 wherein a washer is carried about the stud between the nut and the legs.

7. The combination called for in claim 5 wherein the base plate is elongated and has an upwardly extending boss thereon near the end opposite the stud for engagement with the said other ring to prevent longitudinal movement of the ring on the handle.

8. The combination called for in claim 5 wherein a flange is provided on the adapter plate parallel to the bifurcated portion to engage a reel foot positioned between the bifurcated portion and the flange to prevent sidewise movement of the reel foot.

9. A fishing reel attachment device comprising, an adapter plate; an outwardly extending member on one end of the plate; a bifurcated portion on the other end of the plate, providing spaced parallel legs, said legs being spaced apart at their outer ends; an adjustment member having a base plate movable with respect to the legs; a threaded stud carried by the base plate extending between the lugs; a threaded nut carried on the stud; and means extending inwardly of the outer ends of the legs to retain the stud between the legs.

10. A fishing reel attachment device comprising, an adapter plate; an outwardly extending member on one end of the plate; a bifurcated portion on the other end of the plate, providing spaced parallel legs, said legs being spaced apart at their outer ends; an adjustment member having an elongated base plate movable with respect to the legs; a threaded stud carried by the base plate extending between the legs; a threaded nut carried on the stud; and an outwardly extending boss on the base plate spaced from the stud and arranged to extend between the legs.

11. A fishing reel attachment device comprising, an adapter plate; an outwardly extending member on one end of the plate; a bifurcated portion on the other end of the plate, providing spaced parallel legs, said legs being spaced apart at their outer ends; an adjustment member having a base plate movable with respect to the legs; a threaded stud carried by the base plate extending between the legs; a threaded nut carried on the stud; and protrusions formed on the underside of the adapter plate.

12. A fishing reel attachment device comprising, an adapter plate; an outwardly extending member on one end of the plate; a bifurcated portion on the other end of the plate, providing spaced parallel legs, said legs being spaced apart at their outer ends; an adjustment member having a base plate movable with respect to the legs; a threaded stud carried by the base plate extending between the legs; a threaded nut carried on the stud; and the lower edges of the first named end of the adapter plate being turned inwardly.

References Cited in the file of this patent

UNITED STATES PATENTS

| | | |
|---|---|---|
| 1,698,341 | Maury | Jan. 8, 1929 |
| 2,143,289 | Toolan | Jan. 10, 1939 |
| 2,808,675 | Sharp | Oct. 8, 1957 |
| 2,837,858 | Benson | June 10, 1958 |

FOREIGN PATENTS

| | | |
|---|---|---|
| 1,133,203 | France | Nov. 12, 1956 |
| 1,155,954 | France | Dec. 9, 1957 |
| 9,180 | Great Britain | July 3, 1889 |
| 466,521 | Great Britain | May 31, 1937 |